US012349217B2

United States Patent
Jang et al.

(10) Patent No.: US 12,349,217 B2
(45) Date of Patent: Jul. 1, 2025

(54) ELECTRONIC DEVICE FOR TRANSMITTING DATA IN BLUETOOTH NETWORK ENVIRONMENT, AND METHOD THEREFOR

(71) Applicant: Samsung Electronics Co., Ltd., Gyeonggi-do (KR)

(72) Inventors: Wonkyoung Jang, Gyeonggi-do (KR); Doosuk Kang, Gyeonggi-do (KR); Seongbok Kim, Gyeonggi-do (KR); Seongji Kim, Gyeonggi-do (KR); Inshik Shin, Gyeonggi-do (KR); Yunmi Ju, Gyeonggi-do (KR); Sungjun Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 497 days.

(21) Appl. No.: 17/714,345

(22) Filed: Apr. 6, 2022

(65) Prior Publication Data
US 2022/0232647 A1 Jul. 21, 2022

Related U.S. Application Data

(63) Continuation of application No. PCT/KR2020/013674, filed on Oct. 7, 2020.

(30) Foreign Application Priority Data

Oct. 8, 2019 (KR) .................. 10-2019-0124764

(51) Int. Cl.
*H04L 5/00* (2006.01)
*H04L 1/08* (2006.01)
(Continued)

(52) U.S. Cl.
CPC ............... *H04W 76/14* (2018.02); *H04L 1/08* (2013.01); *H04L 5/0053* (2013.01); *H04W 4/80* (2018.02)

(58) Field of Classification Search
CPC ....... H04W 76/14; H04W 4/80; H04W 84/18; H04W 28/04; H04W 28/10; H04W 76/15; H04L 1/08; H04L 5/0053; H04L 5/0057
See application file for complete search history.

(56) References Cited

U.S. PATENT DOCUMENTS 6,973,071 B1 * 12/2005 Bourk .................. H04W 28/10
370/349
8,014,392 B2 9/2011 Smith
(Continued)

FOREIGN PATENT DOCUMENTS

KR 10-2017-0038825 A 4/2017

OTHER PUBLICATIONS

Maria Calderon; "Active Networks Support for Multicast Applications"; 1998.
Korean Office Action dated Jan. 31, 2025.

*Primary Examiner* — Edan Orgad
*Assistant Examiner* — Malick A Sohrab
(74) *Attorney, Agent, or Firm* — Cha & Reiter, LLC.

(57) ABSTRACT

Disclosed is an electronic device which includes wireless communication circuitry, a processor, and a memory. The memory stores one or more instructions that, when executed, cause the processor to establish a first communication link with a first external electronic device, to establish a second communication link with a second external electronic device, to transmit first communication link information for estimating a channel of the first communication link to the second external electronic device over the second communication link, to receive first data from the first external electronic device over the first communication link, and to (Continued)

transmit a first response message for the first data to the first external electronic device over the first communication link. The first response message includes a bit configured not to be processed by the first external electronic device, and the bit includes reception information about the first data of the electronic device.

9 Claims, 11 Drawing Sheets

(51) Int. Cl.
 *H04W 4/80* (2018.01)
 *H04W 76/14* (2018.01)

(56) References Cited

U.S. PATENT DOCUMENTS

| | | | |
|---|---|---|---|
| 8,768,252 B2 | 7/2014 | Watson et al. | |
| 9,020,437 B2 | 4/2015 | Watson et al. | |
| 9,621,987 B2 | 4/2017 | Watson et al. | |
| 9,712,951 B2 | 7/2017 | Kirshenberg et al. | |
| 10,148,453 B2 | 12/2018 | Batra et al. | |
| 10,548,068 B2 | 1/2020 | Lee et al. | |
| 10,681,591 B2 | 6/2020 | Lee et al. | |
| 2009/0232041 A1 | 9/2009 | Smith | |
| 2012/0058727 A1* | 3/2012 | Cook | H04R 5/04 455/41.3 |
| 2014/0113682 A1* | 4/2014 | Polehn | H04L 1/14 455/566 |
| 2015/0327001 A1* | 11/2015 | Kirshenberg | H04W 4/80 455/41.2 |
| 2015/0358067 A1* | 12/2015 | Zhang | H04W 84/047 370/315 |
| 2017/0215113 A1 | 7/2017 | Lee et al. | |
| 2017/0223579 A1 | 8/2017 | Lee et al. | |
| 2017/0223615 A1 | 8/2017 | Lee et al. | |
| 2017/0244576 A1 | 8/2017 | Batra et al. | |
| 2020/0322092 A1* | 10/2020 | Goyal | H04L 1/0072 |
| 2020/0336958 A1* | 10/2020 | Sridhara | H04W 36/035 |
| 2021/0345044 A1 | 11/2021 | Watson et al. | |

\* cited by examiner

ELECTRONIC DEVICE FOR TRANSMITTING DATA IN BLUETOOTH NETWORK ENVIRONMENT, AND METHOD THEREFOR

CROSS-REFERENCE TO RELATED APPLICATION(S)

This application is a Continuation of and claims priority under 35 U.S.C. § 120 to PCT International Application No. PCT/KR2020/013674, which was filed on Oct. 7, 2020, and claims priority to Korean Patent Application No. 10-2019-0124764, filed on Oct. 8, 2019, in the Korean Intellectual Property Office, the disclosure of which are incorporated by reference herein their entirety.

BACKGROUND

Technical Field

One or more embodiments disclosed in the instant disclosure generally relate to an electronic device for transmitting data in a Bluetooth network environment and a method thereof.

Description of Related Art

The Bluetooth standard defined by the Bluetooth Special Interest Group (SIG) defines a protocol for short-range wireless communication between electronic devices. In the Bluetooth network environment, electronic devices may transmit or receive data packets, including content such as texts, voices, images, or videos, in a specified frequency band (e.g., about 2.4 gigahertz (GHz)).

For example, user equipment (UE), such as smartphones, tablets, desktop computers, or laptop computers, may transmit data packets to another UE or an accessory device through the Bluetooth network environment. The accessory device may include, for example, earphones, headsets, speakers, mice, keyboards, chargers, display devices, etc.

SUMMARY

The Bluetooth network environment may be implemented in a topology that includes one user device (e.g., a device under test (DUT)) for transmitting data packets and a plurality of devices for receiving data packets from the user device. For example, when earphones (or a headset) are connected with a smartphone, the earphone worn on the left ear of the user and the earphone worn on the right ear of the user may receive different data packets from the smartphone.

In wireless data transmission, each of the plurality of devices receiving data packets may establish a separate link with the host or master user device. In this case, because the user device need to create or establish a plurality of links to transmit data packets to the plurality of devices, resources and power consumed by the user device may increase, which may reduce battery life. Increasing complexity in the Bluetooth network environment is also not desirable. Furthermore, as the number of devices connected wirelessly to the user device increases, the power consumed by the user device and the latency between transmission and reception of the data packets may also increase.

Various embodiments disclosed in the disclosure may provide an electronic device and a method for addressing the above-mentioned problems in the Bluetooth network environment.

In accordance with an aspect of the disclosure, an electronic device is provided. The electronic device may include wireless communication circuitry, a processor operatively connected with the wireless communication circuitry, and a memory operatively connected with the processor. The memory may store one or more instructions that, when executed, cause the processor to establish a first communication link with a first external electronic device through the wireless communication circuitry, create a second communication link with a second external electronic device through the wireless communication circuitry, transmit first communication link information for estimating a channel of the first communication link to the second external electronic device over the second communication link, receive first data from the first external electronic device over the first communication link, and transmit a first response message for the first data to the first external electronic device over the first communication link. The first response message may include a bit configured not to be processed by the first external electronic device. The bit may include reception information about the first data by the electronic device.

In accordance with another aspect of the disclosure, an electronic device is provided. The electronic device may include wireless communication circuitry, a processor operatively connected with the wireless communication circuitry, and a memory operatively connected with the processor. The memory may store one or more instructions that, when executed, cause the processor to establish a first communication link with a first external electronic device through the wireless communication circuitry, receive second communication link information for estimating a channel of a second communication link established between the first external electronic device and a second external electronic device from the first external electronic device over the first communication link, receive first data from the second external electronic device over the second communication link, based on the second communication link information, receive a first response message including reception information about the first data by the first external electronic device over the second communication link, and identify whether the first data is received by the first external electronic device by using a bit configured not to be processed by the second external electronic device in the first response message.

Additional aspects will be set forth in part in the description which follows and, in part, will be apparent from the description, or may be learned by practice of the presented embodiments.

BRIEF DESCRIPTION OF DRAWINGS

The above and other aspects, features, and advantages of certain embodiments of the present disclosure will be more apparent from the following description taken in conjunction with the accompanying drawings, in which.

With regard to description of drawings, the same or similar denotations may be used for the same or similar components.

DETAILED DESCRIPTION

According to certain embodiments disclosed in the disclosure, the electronic device may reduce unnecessary resources consumed in the Bluetooth network environment, and also reduce delays in data processing.

Hereinafter, certain embodiments of the disclosure may be described with reference to accompanying drawings. However, it should be understood that this is not intended to limit the disclosure to specific implementation forms and includes various modifications, equivalents, and/or alternatives of embodiments of the disclosure.

Hereinafter, a configuration of an electronic device according to an embodiment will be described with reference to FIG. 1.

Figure 1:
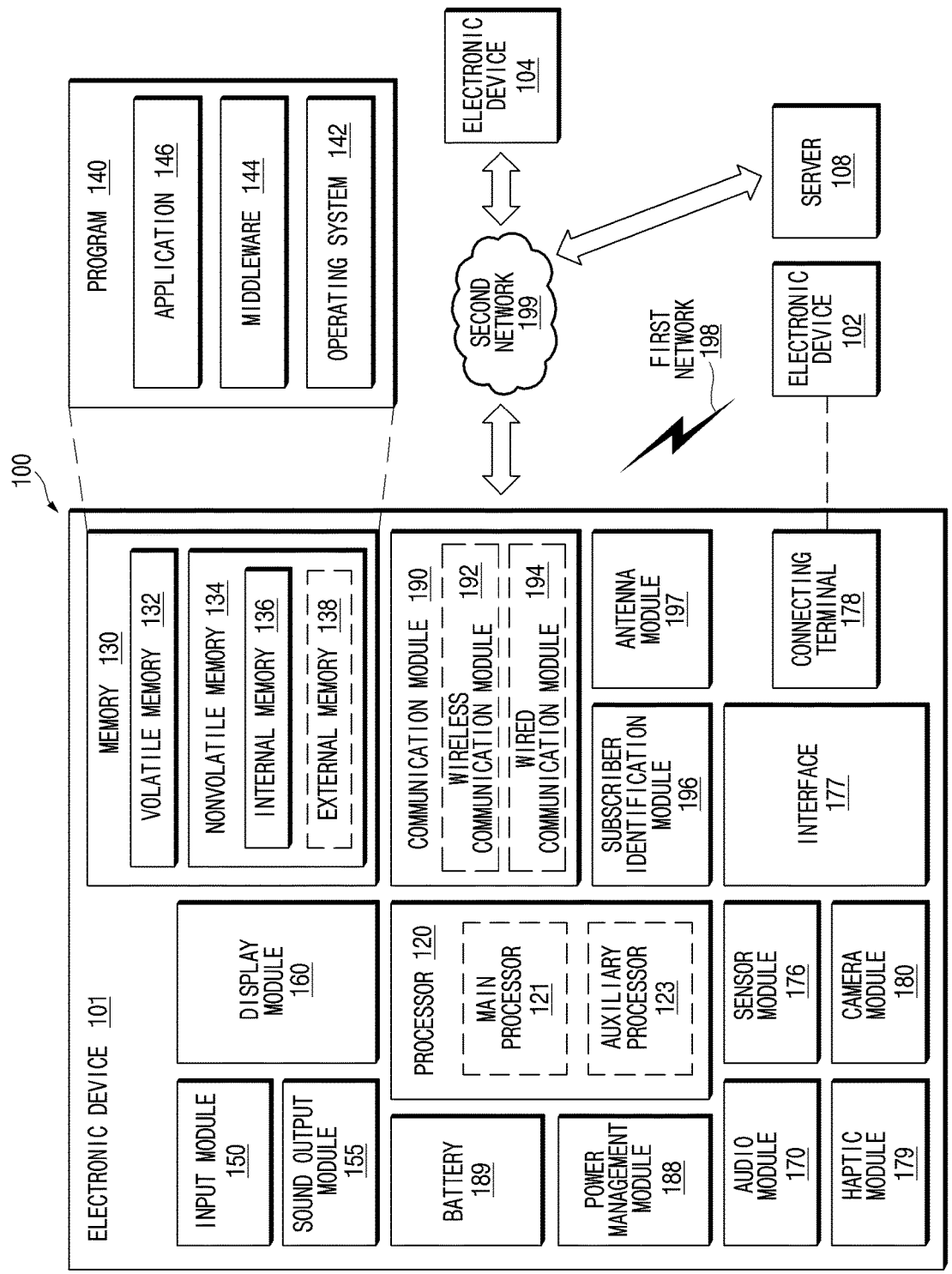
FIG. 1 is a block diagram illustrating an electronic device in a network environment according to an embodiment.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Hereinafter, operations of a plurality of devices according to certain embodiments will be described with reference to FIGS. 2 and 3.

Figure 2:
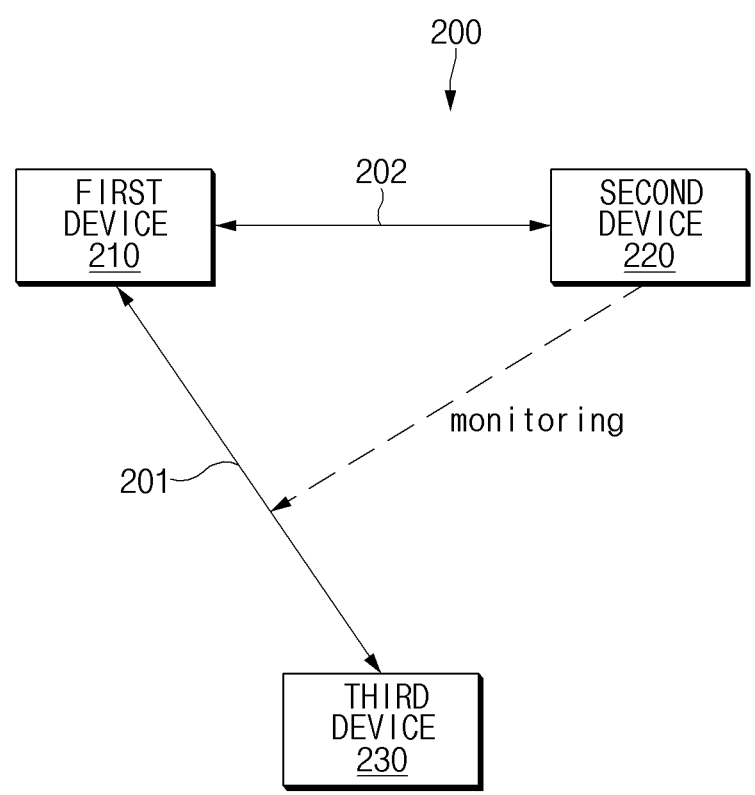
FIG. 2 illustrates a topology of a Bluetooth network environment according to an embodiment.

FIG. 2 illustrates a topology 200 of a Bluetooth network environment according to an embodiment. FIG. 3 is a signal sequence diagram 300 illustrating operations of a plurality of devices in a Bluetooth network environment according to an embodiment.

Figure 3:
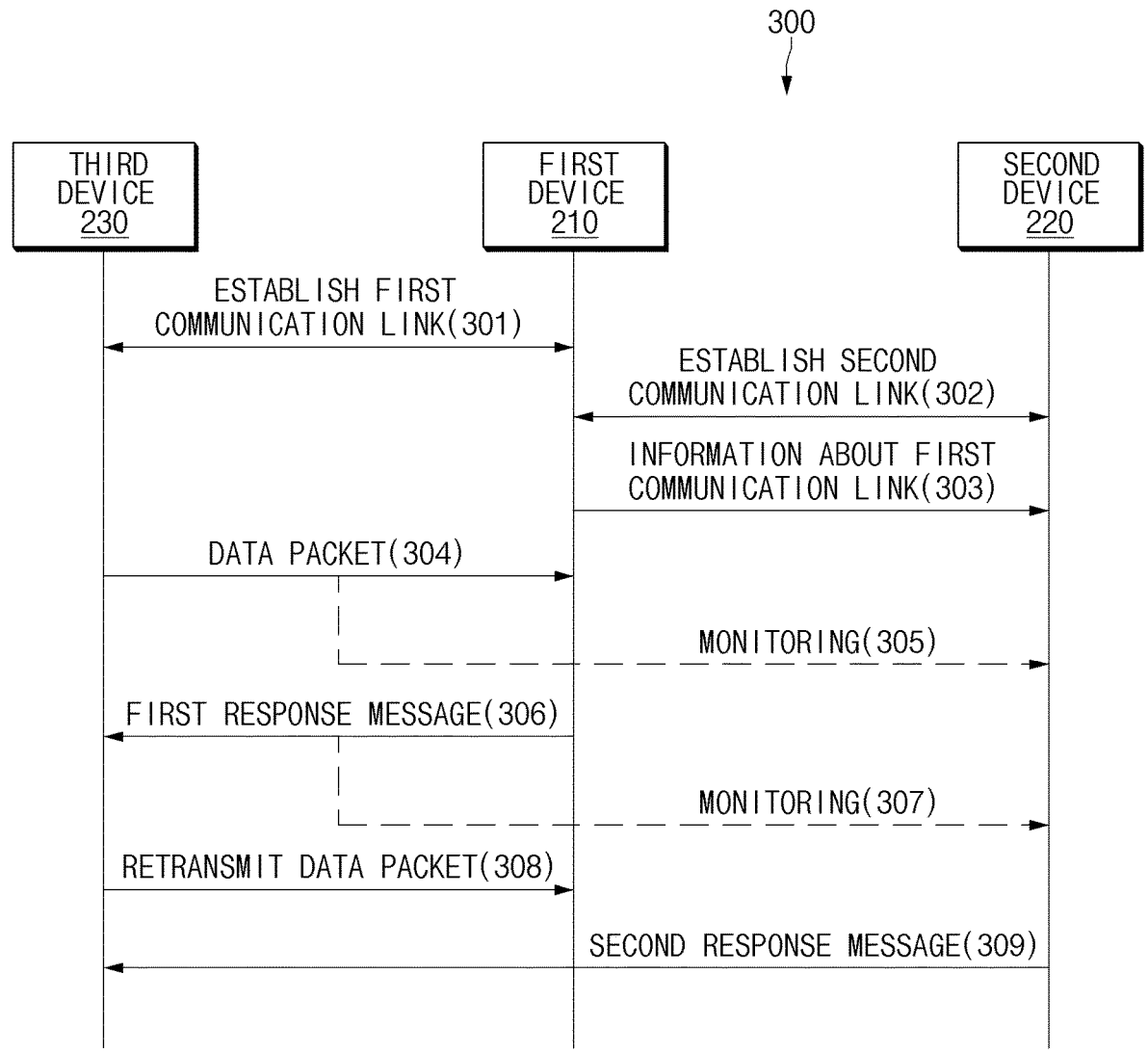
FIG. 3 is a signal sequence diagram illustrating operations of a plurality of devices in a Bluetooth network environment according to an embodiment.

The order of the plurality of operations shown in FIG. 3 is not limiting, and for example the order of the communication link establishment operation and the data transmission operation may be changed.

Referring to FIG. 2, a first device 210, a second device 220, and a third device 230 included in the topology 200 may include components at least some of which are the same as or similar to an electronic device 101 shown in FIG. 1. These devices may also perform functions at least some of which are the same as or similar to the electronic device 101. According an embodiment, the first device 210, the second device 220, and the third device 230 may perform wireless communication over a short distance in a Bluetooth network defined by the Bluetooth SIG. The Bluetooth network may be, for example, the Bluetooth legacy network or the Bluetooth low energy (BLE) network. According to an embodiment, the first device 210, the second device 220, and the third device 230 may perform wireless communication over one of the Bluetooth legacy network and the BLE network or may perform wireless communication over both of the Bluetooth legacy network and the BLE network.

According an embodiment, the third device 230 may be user equipment, such as a smartphone, a tablet, a desktop computer, or a laptop computer, and the first device 210 and the second device 220 may be accessory devices, such as earphones, a headset, a speaker, a mouse, a keyboard, or a display device. According an embodiment, the first device 210 and the second device 220 may be an earphone worn on the left ear of the user and an earphone worn on the right ear of the user, respectively. Thus, the first device 210 and the second device 220 may be paired earphones. However, according to another embodiment, the first device 210 and the second device 220 may be two different sets of earphones.

According to an embodiment, each of the first device 210 and the second device 220 may previously recognize a counterpart device (e.g., the second device 220 or the first device 210) or may previously store information (e.g., address information) of the counterpart device. According an embodiment, when the first device 210 and the second device 220 is accessory devices (e.g., earphones) that are paired, they may previously recognize each other or may previously store mutual address information. According to an embodiment, when the first device 210 and the second device 220 are devices supporting the same user account or related user accounts (e.g., family accounts), they may share information about each other (information about devices which are a pair) by means of an external device (e.g., an external server) interworking with the first device 210 or the second device 220. In this case, the topology 200 may further include an external server. For example, the first device 210 may transmit information associated with the first device 210 to the external server, and the external server may transmit the information associated with the first device 210 to the second device 220.

According to an embodiment, the third device 230 may serve as the master device, and the first device 210 and the second device 220 may serve as slave devices. The number of devices which service as slave devices is not limited to the example shown in FIG. 2. According to an embodiment, the role of the device may be determined in a procedure where a communication link (e.g., 201 and/or 202) between devices is established. According to another embodiment, one (e.g., the first device 210) of the first device 210 and the second device 220 may serve as the master device, and the other (e.g., the second device 220) may serve as the slave device.

The master device may control a physical channel. According an embodiment, the master device may transmit data packets, whereas the slave device may transmit data packets to the master device only after receiving the data packets from the master device. According an embodiment, a channel resource (e.g., a frequency hopping channel) for transmitting data packets may be generated based on a clock of the master device. In the Bluetooth legacy network, a time resource (e.g., a time slot) may be determined based on the clock of the master device. According an embodiment, the time slot may be, for example, 625 microseconds (us). In the BLE network, the master device and the slave device may transmit data packets at specified intervals and may respond after a specified time period (e.g., the inter frame space (T_IFS), about 150 us), when a data packet is received.

Hereinafter, description will be given with regard to a situation where the third device 230 operates as the master device and the other devices (210 and/or 220) operate as slave devices According to an embodiment, the third device 230 may transmit a data packet including content such as text, sound, image, or video to other devices 210 and/or 220. According to the type of content included in the data packet, at least one of the other device 210 and/or 220 as well as the third device 230 may transmit the data packet.

According an embodiment, when music is played from the third device 230, only the third device 230 may transmit data packets, whereas, when a call is performed on the third device 230, at least one of the first device 210 and the second device 220 as well as the third device 230 may also transmit data packets including content (e.g., voice data). In this embodiment, at least one of the first device 210 and the second device 220 may include a sound input device (e.g., microphone) and may receive voice data through the sound input device.

When only the third device 230 transmits data packets, the third device 230 may be referred to as a source device and the first device 210 and/or the second device 220 may be referred to as sink devices.

When the third device 230 creates or establishes a plurality of links with a plurality of other devices (the first device 210 and the second device 220) to transmit data packets, resource consumption, power consumption, and complexity of the links of the third device 230 may increase. According to an embodiment, the third device 230 may establish a first communication link 201 with the first device 210 and may transmit data packets over the first communication link 201, and the second device 220 may monitor the first communication link 201 to receive data packets transmitted over the first communication link 201, where the data packets include content. In this case, the third device 230 may be referred to as a device under test (DUT), the first device 210 may referred to as a primary earbud or primary equipment (PE), and the second device 220 may be referred to as a secondary earbud or secondary equipment (SE).

Referring to FIGS. 2 and 3, in operation 301, the first device 210 may establish the first communication link 201 with the third device 230. In operation 302, the first device 210 may establish the second link 202 with the second device 220.

For example, in operation 303, the first device 210 may transmit information associated with the first communication link 201 to the second device 220 over the second communication link 202, such that the second device 220 may monitor the first communication link 201 and may transmit a response message to the third device 230.

Alternatively, according to an embodiment, the second device 220 may establish a first communication link with the third device 230, and the second device 220 and the first device 210 may establish the second communication link 202. The second device 220 may transmit information associated with the first communication link to the first device 210 over the second communication link 202, and the first device 210 may monitor the first communication link. For example, the first device 210 may receive data packets transmitted from the third device 230 and/or may transmit response messages for the received data packets to the third device 230.

Alternatively, according to an embodiment, when the first device 210 and the second device 220 are devices supporting the same user account or related user accounts (e.g., family accounts), they may share information associated with the first communication link 201 via the external device (e.g., the external server) interworking with the first device 210 or the second device 220, which in turn uses the user account information. In this case, the topology 200 may further include an external server. For example, the first device 210 may transmit information associated with the first communication link 201 to the external server, and the external server may transmit the information associated with the first communication link 201 to the second device 220.

According to an embodiment, the first device 210 and the second device 220 may first establish a communication link (e.g., the second communication link 202), and the first device 210 may establish a communication link (e.g., the first communication link 201) with the third device 230. The first device 210 may transmit information about a communication link (e.g., the first communication link 201) established with the third device 230 to the second device 220 over a link (e.g., the second communication link 202) established with the second device 220.

The information associated with the first communication link 201 may include address information (e.g., the Bluetooth address of the master device of the first communication link 201, the Bluetooth address of the third device 230, and/or the Bluetooth address of the first device 210), piconet clock information (e.g., a clock native (CLKN) of the master device of the first communication link 201), logical transport (LT) address information (e.g., information assigned by the master device of the first communication link 201), used channel map information, link key information, service discovery protocol (SDP) information (e.g., service and/or profile information associated with the first communication link 201), and/or supported feature information. The information associated with the first communication link 201 may further include, for example, an extended inquiry response (EIR) packet. The EIR packet may include resource control information of the first communication link 201 and/or information about the manufacturer of the third device 230 and/or the first and second devices 210 and 220.

According to another embodiment, the second device 220 may share the information associated with the first communication link 201 with the third device 230. For example, the third device 230 may transmit the information associated with the first communication link 201 to the second device 220 over a separate communication link (not shown) and may release the separate communication link (not shown), when the information associated with the first communication link 201 is transmitted.

In operation 304, the third device 230 may transmit data packet(s) to the first device 210 over the first communication link 201.

In operation 305, although not directly creating a link with the third device 230, the second device 220 may monitor the first communication link 201 using the information about the first communication link 201, which is received from the first device 210, to receive the data packet(s) from the third device 230.

According to an embodiment, in operation 306, the first device 210 may transmit a first response message for providing a notification whether the data packet is normally received to the third device 230 over the first communication link 201.

In the disclosure, when the data packet is normally received, it may mean that the data is successfully received and processed (e.g., decoded or parsed) by the first device 210.

The first response message may include first reception information and second reception information.

Each of the first reception information and the second reception information may include positive acknowledgement (ACK) information indicating the data packet is normally received or negative acknowledgement (NACK) information indicating that the data packet is not normally received (or that the received data is not normally processed).

When the first reception information included in the first response message is ACK information, the third device 230 may transmit the next data packet. When the first reception information is NACK information or when the response message is not received within a specified time period, the third device 230 may retransmit the same data packet. The third device 230 may ignore the second reception information included in the first response message without identifying (processing) the second reception information.

Because the first device 210 does not know whether the second device 220 has successfully received the data packet, it may set the first reception information of the first response message to indicate NACK and may transmit the first response message to the third device 230. In other words, when there is no information about whether the second device 220 has successfully received the data packet in the first device 210, the first device 210 may indicate the first reception information as NACK and transmit the first response message, irrespective of whether the first device 210 itself has successfully received the data packet.

The first device 210 may indicate whether the first device 210 has actually and successfully received the data packet as ACK/NACK in the second reception information of the first response message and may transmit the first response message. According an embodiment, when successfully receiving the data packet, the first device 210 may set the second reception information of the first response message to indicate ACK. According an embodiment, when not normally receiving the data packet, the first device 210 may set the second reception information of the first response message to indicate NACK.

In operation 307, the second device 220 may monitor the first communication link 201 to receive the first response message 306 transmitted to the third device 230 over the first communication link 201 by the first device 210. The second device 220 may identify the second reception information included in the first response message 306 to identify whether the first device 210 has successfully received the data packet.

In operation 308, the third device 230 may identify that the first reception information of the received first response message indicates NACK and may retransmit the same data packet. Although not illustrated in FIG. 3, according to an embodiment, the second device 220 may monitor the first communication link 201 to receive the retransmitted data packet.

In operation 309, the second device 220 may transmit a second response message to the third device 230 over the first communication link 201, in response to the data packet retransmission 308. According an embodiment, when transmitting the second response message, the second device 220 may use the address of the first device 210 to pose as the first device 210. This way the second device 220 transmits the second response message as if the first device 210 transmits the second response message. When the third device 230 does not know the presence of the second device 220, it may simply determine that the second response message is received from the first device 210 over the first communication link 201 connected with the first device 210. According to another embodiment, the third device 230 may know the presence of the second device 220. For example, the third device 230 may know the presence of the second device 220 through the first device 210 or through direct communication with the second device 220. According to another embodiment, the third device 230 may infer whether the second device 220 is present using the value of the FLOW field of the received response message.

The second device 220 may transmit the second response message to the first device 210 over the second communication link 202. However, in this case, because the first device 210 would use some of its resources to receive data packets from the third device 230, resource consumption may increase. When some of resources of the first device 210 are used, because the third device 230 does not receive the response message or a delay may occur, performance of data packet transmission may be degraded and power consumption may increase. Furthermore, as the number of devices (e.g., 220) that do not have separate communication links directly with the third device 230 increases, the time required for the first device 210 to determine whether the data packet is received from another device (e.g., 220) may also increase.

According to an embodiment, the second device 220 may monitor the first communication link 201 using the received information about the first communication link 201 and may transmit a response message to the third device 230 without passing through the first device 210. For example, the second device 220 may calculate a hopping channel using the Bluetooth address and Bluetooth clock information included in the received information about the first communication link 201 and may decrypt the normally encrypted data using Bluetooth link key information. Based on the above, the second device 220 may monitor Bluetooth communication over the first communication link 201 between the first device 210 and the third device 230. For example, the second device 220 may match the hopping channel and the clock time point of the Bluetooth address of the first device 210, using the received connection information of the first communication link 201, may use the matched information to operate an RF transmission unit, and may transmit a response message to the third device 230 over the first communication link 201. For example, the second device 220 may generate an access code and address information (e.g., LT address information) corresponding to the first communication link 201 based on address information included in the received information associated with the first communication link 201 and may transmit a second response message including the generated access code and the generated address information to the third device 230.

The second response message may include first reception information and second reception information. The first reception information of the second response message may be information where the second device 220 combines the second reception information of the first response message, received by the second device 220, with whether the data packet transmitted in operation 304 by the third device 230 and/or the data packet retransmitted in operation 308 by the third device 230 are/is successfully received.

According an embodiment, when the second reception information of the first response message indicates ACK and when the second device 220 has successfully received the data packet, the second device 220 may transmit a second response message indicating ACK as the first reception information of the second response message to the third device 230.

According an embodiment, when the second reception information of the first response message indicates ACK and when the second device 220 has not successfully received the data packet, the second device 220 may transmit a second response message indicating NACK as the first reception information of the second response message to the third device 230 or may fail to transmit the second response message to the third device 230.

According an embodiment, when the second device 220 does not receive the first response message within a specified time period from the first device 210 or when the second reception information of the received first response message indicates NACK, irrespective of whether the second device 220 successfully receives the data packet, the second device 220 may transmit the second response message indicating NACK as the first reception information of the second response message to the third device 230 or may fail to transmit the second response message to the third device 230.

The second device 220 may indicate whether the second device 220 actually and successfully receives the data packet as ACK/NACK in the second reception information of the second response message and may transmit the second response message. According an embodiment, when normally (i.e. successfully) receiving the data packet, the second device 220 may set the second reception information of the second response message to indicate ACK. According an embodiment, when not normally receiving the data packet (i.e. receiving and/or processing of the data packet failed), the second device 220 may set the second reception information of the second response message to indicate NACK.

Although not illustrated in FIG. 3, according to an embodiment, the first device 210 may monitor the first communication link 201 to receive the second response message 309 transmitted to the third device 230 over the first communication link 201 by the second device 220. The first device 210 may identify the second reception information included in the second response message to identify whether the second device 220 has successfully received the data packet.

Although not illustrated in FIG. 3, according to an embodiment, the third device 230 may identify the first reception information of the second response message, may transmit the next data packet, when the first reception information indicates ACK, and may retransmit the same data packet, when the first reception information indicates NACK.

Hereinafter, operations of a plurality of devices according to an embodiment will be described with reference to FIGS. 2, 3, 4, and 5. The same configuration and operation as the above-described embodiment may refer to the same reference numeral, and a description thereof will be omitted.

Figure 4:
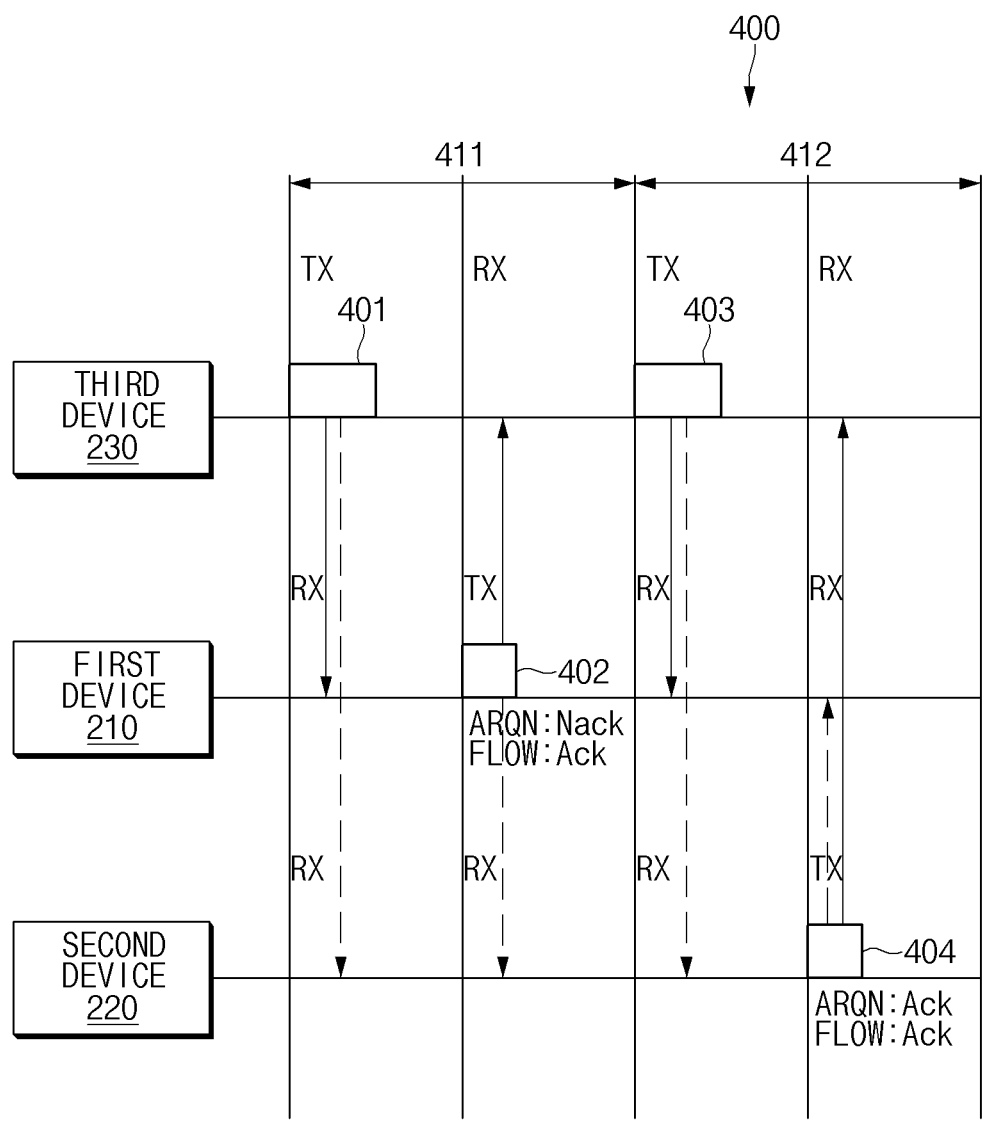
FIG. 4 is a drawing illustrating an operation of transmitting response messages of a plurality of devices in a Bluetooth network environment according to an embodiment.
Figure 5:
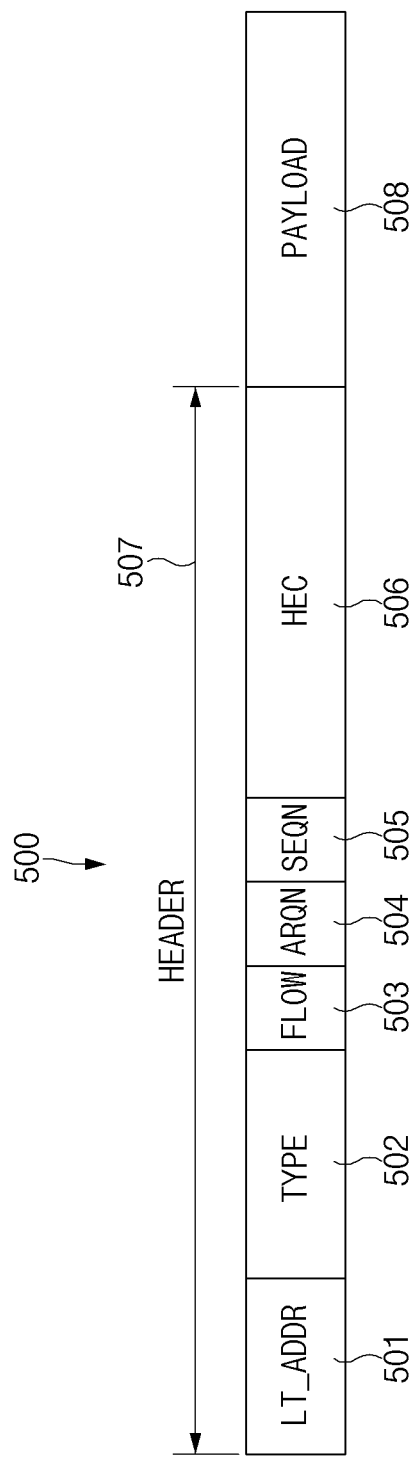
FIG. 5 is a drawing illustrating a Bluetooth packet according to an embodiment.

FIG. 4 is a drawing 400 illustrating an operation of transmitting response messages of a plurality of devices in a Bluetooth network environment according to an embodiment. FIG. 5 is a drawing illustrating a Bluetooth packet 500 according to an embodiment.

The order of the plurality of operations shown in FIG. 4 is not limiting, and for example the order of the communication link establishment operation and the data transmission operation may be changed.

Referring to FIGS. 2, 3, and 4, in operation 304, the third device 230 may transmit a data packet 401 to the first device 210 over a first communication link 201 in a time slot 411 reserved to transmit the data packet 401. According to an embodiment, the data packet 401 may be audio data. The reserved time slot 411 may include a master to slave slot (a TX slot with respect to the third device) and a slave to master slot (a RX slot with respect to the third device).

The first device 210 and the second device 220 which monitors the first communication link 201 may receive the data packet 401.

In response to the data packet 401, the first device 210 may transmit a first response message 402 to the third device 230 over the first communication link 201 in a slot (e.g., TX slot with respect to the first device 210) subsequent to a slot (e.g., RX slot with respect to the first device 210) in which the data packet 401 is received in the reserved time slot 411. At this time, because the first device 210 transmits the first response message 402, the second device 220 may operate in a reception mode for the first communication link 201.

Referring to FIG. 5, description will be given of the structure of the first response message 402. According to an embodiment, the packet 500 of the first response message 402 may include a header 507 and a payload 508. The header 507 according to an embodiment may include an LT_ADDR field 501 including 3-bit logical transport address information, a TYPE field 502 including 4-bit type information, a FLOW field 503 including 1-bit flow control information, an ARQN field 504 including 1-bit reception information (acknowledge indication), an SEQN field 505 including sequence number information, and an HEC field 506 including 8-bit header error check information.

The FLOW field 503 may be used to control asynchronous connection less (ACL) data flow. The FLOW field 503 may be set to 1 (GO) or 2 (STOP) and may normally use the 1 (GO) value. When ACL data is not received any longer, the FLOW field 503 may be set to the 2 (STOP) value such that the ACL data is not delivered any longer. The FLOW field 503 may not be used in synchronous connection oriented (SCO) or extended synchronous connection oriented (eSCO) logical link, which are different from the ACL logical link, and the receiving device in those links may ignore a value of the FLOW field 503. The SCO and eSCO logical link may be used as the transmission channel of voice data which places emphasis on temporality and is mainly required for real-time transmission. The FLOW field 503 may correspond to the second reception information of the first response message and the second response message in the embodiment described above with reference to FIG. 3.

The ARQN field 504 may be used to deliver reception information. The ARQN field 504 may be set to 1 (reception) (ACK) or 0 (no reception) (NACK) and may deliver reception information about the received packet to the device that transmitted the packet. The ARQN field 504 may correspond to the first reception information of the first response message and the second response message in the embodiment described above with reference to FIG. 3.

Referring again to FIGS. 2, 4, and 5, the first device 210 may transmit the first response message 402, the ARQN field 504 of the header 507 of which has the bit value meaning NACK. Because the first device 210 does not know whether the second device 220 has normally or successfully received the data packet, it may set the ARQN field 504 of the first response message 402 to have the bit value meaning NACK to transmit the first response message 402 to the third device 230.

Furthermore, the first device 210 may set the FLOW field 503 of the header 507 of the first response message 402 to have the bit value indicating ACK or NACK depending on whether the first device 210 actually and successfully receives the data packet 401. According to an embodiment, to notify the second device 220 whether the first device 210 actually and successfully receives the data packet 401, the first device 210 may indicate and transmit whether the first device 210 actually and successfully receives the data packet 401 using the FLOW field 503 which is not processed and is ignored by the third device 230.

The below description assumes the case where the first device 210 has normally or successfully received the data packet 401 and the FLOW field 503 includes ACK information.

According an embodiment, upon receiving the first response message 402, the third device 230 may identify NACK information of the ARQN field 504 of the first response message 402 to determine that the data packet 401 is not normally transmitted to the first device 210 and/or the second device 220.

Furthermore, the third device 230 may ignore the FLOW field 503 of the first response message 402 so as to not process the FLOW field 503 of the first response message 402. According an embodiment, the third device 230 may use the SCO or eSCO logical link for transmission of the data packet 401. In this case, the third device 230 may ignore the FLOW field 503 of the received first response message 402 and will not process the FLOW field 503 of the received first response message 402. According an embodiment, the data packet 401 transmitted by the third device 230 may be audio data. In this case, the third device 230 may ignore the FLOW field 503 of the received first response message 402 and will not process the FLOW field 503 of the received first response message 402.

The second device 220 may monitor the first communication link 201 to receive the first response message 402 transmitted to the third electronic device 230 over the first communication link 201 by the first device 210. According to an embodiment, the second device 220 may identify reception information about the data packet of the first device 210 by means of the FLOW field 503 of the first response message 402. For example, the second device 220 may identify that the FLOW field 503 included in the first response message 402 indicates ACK, which identifies that the first device 210 has normally received the data packet.

According an embodiment, upon receiving the first response message 402, the third device 230 may identify NACK information of the ARQN field 504 of the first response message 402 to determine that the data packet 401 is not normally transmitted to the first device 210 and/or the second device 220. The third device 230 may retransmit the same data packet 403 based on determining that the data packet 401 is not normally transmitted to the first device 210 and/or the second device 220. The third device 230 may retransmit the data packet 403 during a time slot (a retransmission window) allowed for retransmission.

The first device 210 or the second device 220 monitoring the first communication link 201 may receive the retransmitted data packet 403.

The second device 220 may transmit a second response message 404 to the third device 230 over the first communication link 201 in response to the retransmission of the data packet 403. At this time, because the second device 220 transmits the second response message 404, the first device 210 may operate in a reception mode with respect to the first communication link 201.

The second device 220 may indicate information, in which the second device 220 combines information of the FLOW field 503 of the first response message 402 received from the first device 210 with whether the second device 220 successfully receives the data packet 401 or 403, as ACK or NACK in the ARQN field 504 of the second response message 404.

According an embodiment, when the FLOW field 503 of the first response message 402 indicates ACK and when the second device 220 normally receives the data packet 401 or 403, the second device 220 may indicate the ARQN field 504 of the second response message 404 as ACK.

According an embodiment, when the FLOW field 503 of the first response message 402 indicates ACK and when the second device 220 does not normally receive the data packet 401 or 403, the second device 220 may transmit the second response message 404 where the ARQN field 504 of the second response message indicates NACK to the third device 230 or may fail to transmit the second response message 404 to the third device 230.

According an embodiment, when the second device 220 does not receive the first response message 402 within a specified time period from the first device 210 or when the FLOW field 503 of the received first response message 402 indicates NACK, irrespective of whether the second device 220 normally receives the data packet 401 or 403, the second device 220 may transmit the second response message 404 where the ARQN field 504 of the second response message 404 indicates NACK or may fail to transmit the second response message 404 to the third device 230.

The below description assumes the case where the FLOW field 503 of the first response message 402 includes ACK information and that the second device 220 normally receives the data packet 401 or 403 and set the ARQN field 504 of the second response message 404 to indicate ACK to transmit the second response message 404.

The second device 220 may indicate whether the second device 220 actually and successfully receives the data packet 401 or 403 as ACK or NACK in the FLOW field 503 of the second response message 404 and may transmit the second response message 404.

According an embodiment, when normally receiving the data packet 401 or 403, the second device 220 may set the FLOW field 503 of the second response message 404 to indicate ACK. According an embodiment, when not normally receiving the data packet 401 or 403, the second device 220 may set the FLOW field 503 of the second response message 404 to indicate NACK.

According to an embodiment, to notify the first device 210 whether the second device 220 actually and successfully receives the data packet 401 or 403, the second device 220 may indicate and transmit whether the second device 220 actually and successfully receives the data packet 401 or 403 using the FLOW field 503 which is not processed and is ignored by the third device 230.

The below description assumes the case where the second device 220 normally receives the data packet 401 or 403 and the FLOW field 503 of the second response message 404 includes ACK information.

The first device 210 and the third device 230 may receive the second response message 404 transmitted over the first communication link 201.

According an embodiment, receiving the second response message 404, the third device 230 may identify ACK information of the ARQN field 504 of the second response message 404 to determine that the data packet 401 or 403 is normally transmitted to the first device 210 and/or the second device 220. According an embodiment, identifying the ACK information of the ARQN field 504 of the second response message 404, the third device 230 may transmit the next data packet over the first communication link 201.

Furthermore, the third device 230 may ignore the FLOW field 503 of the second response message 404 so as to not process the FLOW field 503 of the second response message 404. The first device 210 may receive the second response message 404 transmitted to the third device 230 over the communication link 201 by the second device 220 and may identify that the FLOW field 503 included in the second response message 404 indicates ACK to identify that the second device 220 normally receives the data packet 401 or 403. According to an embodiment, the first device 210 may identify reception information about the data packet of the second device 220 by using the FLOW field 503 of the second response message 404.

The embodiment described above with reference to FIG. 5 describes that the first device 210 and the second device 220 mutually transmit and identify the reception information about data packet using the FLOW field 503 of the response message. However, according another embodiment, the first device 210 and the second device 220 may use a portion of the payload 508 rather than the FLOW field 503 of the response message for transmission of the reception information. For example, assuming that audio data is transmitted using a 60-byte packet, a packet may be formed to set a first bit of the payload 508 to indicate ACK or NACK like the FLOW field of the above-mentioned embodiment and such that the rest of the payload 508 includes the audio data to be transmitted, and reception information may be delivered.

According to certain embodiments disclosed in the disclosure, the third device 230 may identify reception information about data packets of the first device 210 and the second device 220 by receiving the two different response messages, thus reducing the number of times data packets are retransmitted, reducing power consumed by devices, and reducing the use of the retransmission window to prevent resources of the devices from being wasted.

Hereinafter, operations of a plurality of devices according to an embodiment will be described with reference to FIGS. 2, 6, and 7. The description of the same configuration, operation, and effect as the embodiment described above will be omitted.

Figure 6:
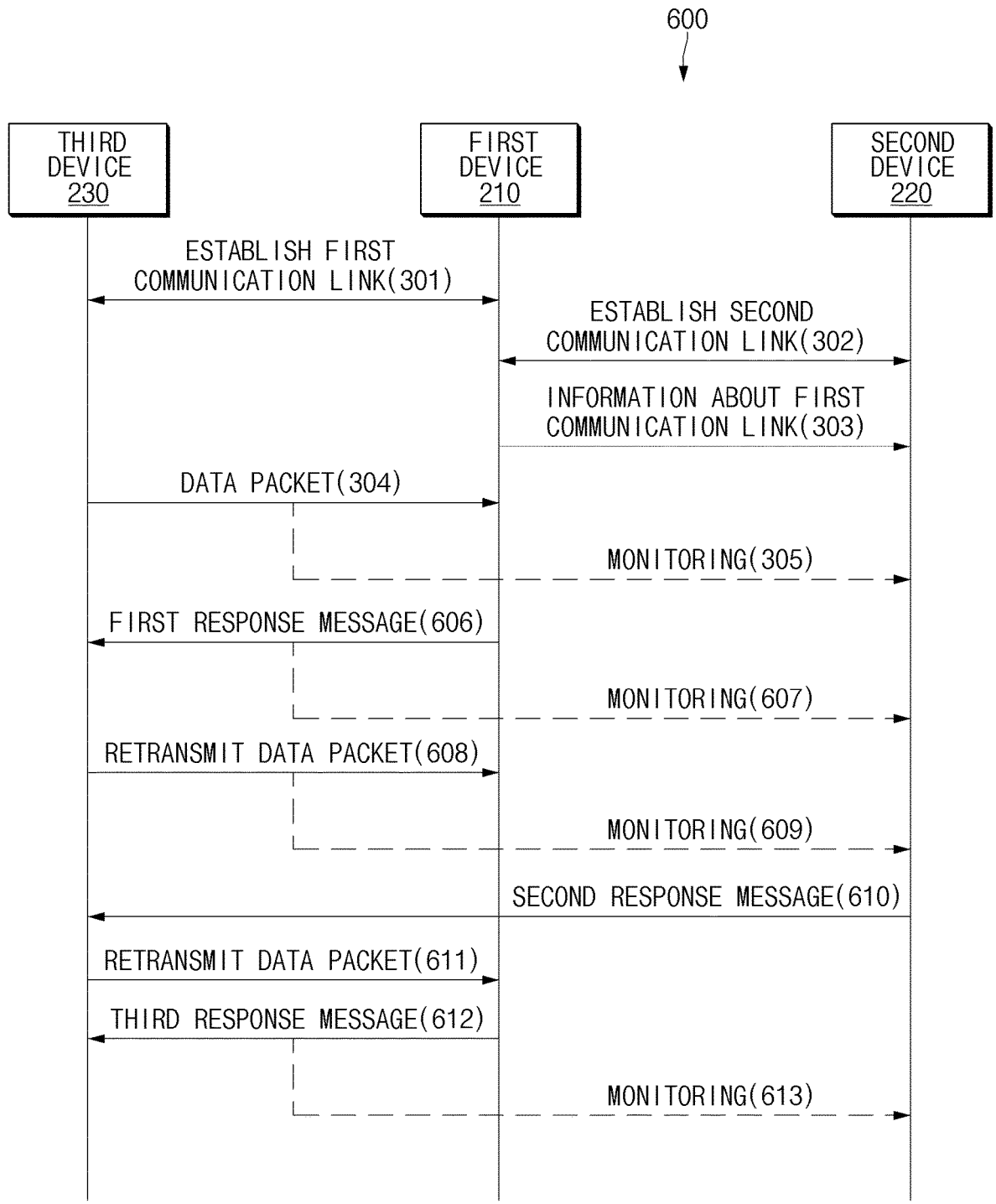
FIG. 6 is a signal sequence diagram illustrating operations of a plurality of devices in a Bluetooth network environment according to an embodiment.

FIG. 6 is a signal sequence diagram 600 illustrating operations of a plurality of devices in a Bluetooth network environment according to an embodiment. FIG. 7 is a drawing 700 illustrating an operation of transmitting response messages of a plurality of devices in a Bluetooth network environment according to an embodiment.

Figure 7:
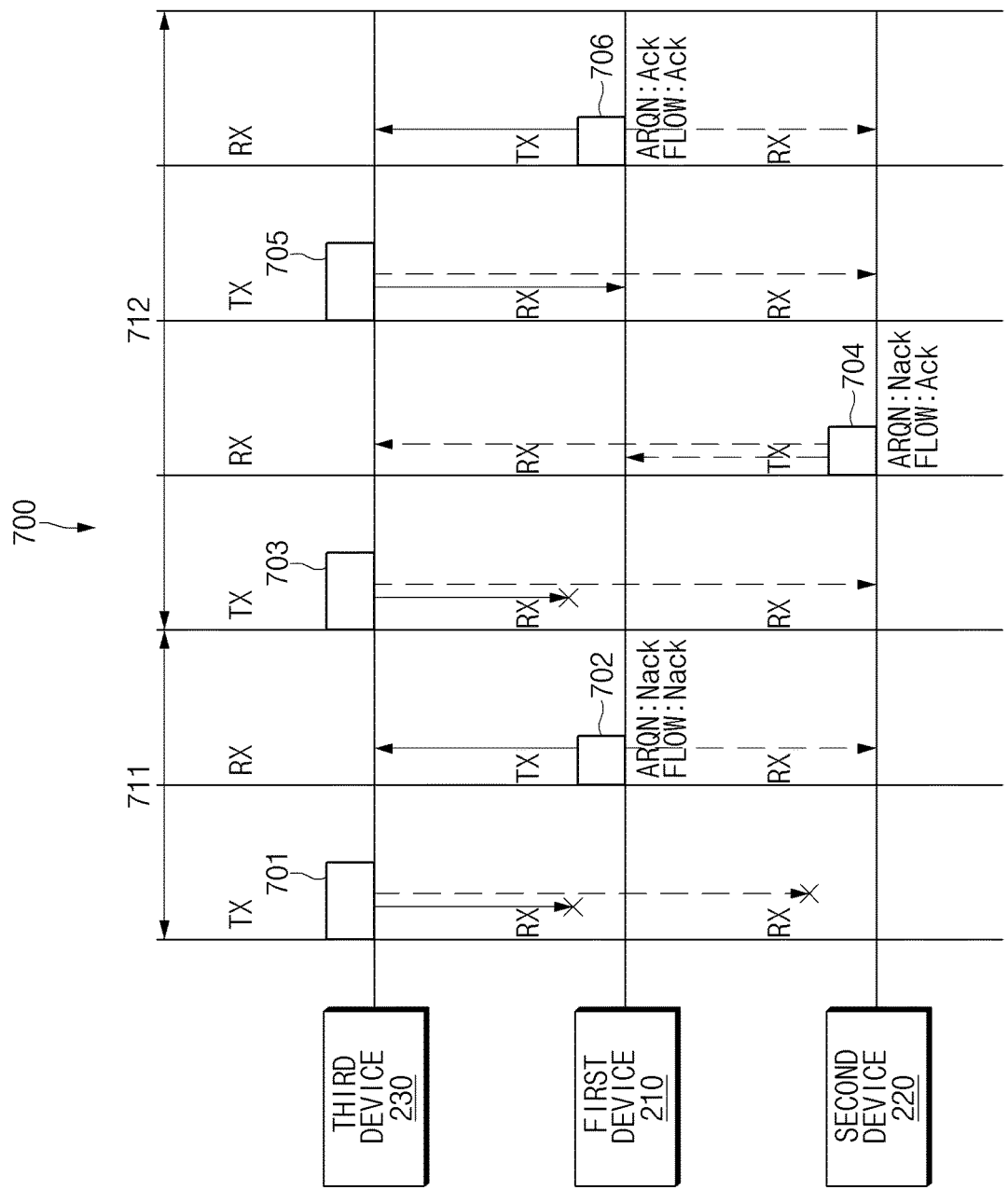
FIG. 7 is a drawing illustrating an operation of transmitting response messages of a plurality of devices in a Bluetooth network environment according to an embodiment.

The order of the plurality of operations shown in FIGS. 6 and 7 is not limiting, and for example the order of the communication link establishment operation and the data transmission operation may be changed.

Referring to FIGS. 2, 6, and 7, the description of operations 301 to 303 may be the same as the embodiment described above with reference to FIG. 3. In operation 304, the third device 230 may transmit a data packet 701 to the first device 210 over the first communication link 201 during a time slot reserved for transmitting the data packet 701. According to an embodiment, the data packet 701 may be audio data. In operation 305, the second device 220 may monitor the first communication link 201 to receive the data packet 701 transmitted to the first device 210 by the third device 230.

The first device 210 and/or the second device 220 monitoring the first communication link 201 may fail to receive the data packet 701 due to, for example, an obstruction in the communication environment.

In response to receiving the data packet 701, the first device 210 may transmit a response message 702 to the third device 230 over the first communication link 201 in a slot subsequent to the slot in which the data packet 701 is received in the reserved time slot 711.

Referring to FIG. 7, the first device 210 may fail to receive the data packet 701. In operation 606, the first device 210 may transmit the first response message 702 to the third device 230. Because the first device 210 does not know whether the second device 220 has normally received the data packet 701, irrespective of whether the first device 210 has normally received the data packet 701, the first device 210 may set the ARQN field (e.g., ARQN field 504 of FIG. 5) of the first response message 702 to indicate NACK and may transmit the first response message 702. Furthermore, because the first device 210 does not actually and successfully receive the data packet 701, it may set the FLOW field (e.g., FLOW field 503 of FIG. 5) of the first response message 702 to indicate NACK and may transmit the first response message 702.

According an embodiment, upon receiving the first response message 702, the third device 230 may identify NACK information of the ARQN field of the first response message 702 to determine that the data packet 701 is not normally transmitted to the first device 210 and/or the second device 220. Furthermore, the third device 230 may ignore the FLOW field of the first response message 702 so as to not process the FLOW field of the first response message 702.

In operation 607, the second device 220 may monitor the first communication link 201 to receive the first response message 702 transmitted to the third device 230 over the first communication link 201 by the first device 210. According to an embodiment, the second device 220 may identify information that the first device 210 has not normally received the data packet 701 using the FLOW field of the first response message 702.

According an embodiment, as the third device 230 identifies the NACK information of the ARQN field of the first response message 702 and determines that the data packet 701 is not normally transmitted to the first device 210 and/or the second device 220, in operation 608, it may retransmit the same time slot 703. The third device 230 may retransmit the data packet 703 during a time slot (retransmission window) allowed for retransmission.

In operation 609, the second device 220 monitoring the first communication link 201 may receive the retransmitted data packet 703. The below description assumes that the first device 210 has not normally received the retransmitted data packet 703 due to some error in the communication environment.

The second device 220 may transmit a second response message 704 to the third device 230 over the first communication link 201 in response to the retransmission of the data packet 703.

Because the FLOW field of the first response message 702 received by the second device 220 is the NACK and because the ARQN field of the second response message 704 indicates the NACK and the second device 220 has normally received the data packet 703, in operation 610, the second device 220 may set the FLOW field of the second response message 704 to indicate ACK and may transmit the second response message 704.

The first device 210 and the third device 230 may receive the second response message 704 transmitted over the first communication link 201.

According an embodiment, upon receiving the second response message 704, in operation 611, the third device 230 may identify NACK information of the ARQN field of the second response message 704 to determine that the data packet 701 or 703 is not normally transmitted to the first device 210 and/or the second device 220 and may retransmit the same data packet 705.

The first device 210 and the second device 220 monitoring the first communication link 201 may receive the data packet 705 retransmitted over the first communication link 201.

In operation 612, the first device 210 may transmit a third response message 706 for the retransmission of the data packet 705 of the third device 230 to the third device 230 over the first communication link 201. According to an embodiment, the first device 210 may transmit the third response message 706 based on the FLOW field of the second response message 704 and information received by the first device 210 (whether at least one of transmission of the data packet 701, the first retransmission of the data packet 703, or the second retransmission of the data packet 705 is received).

Upon normally receiving the data packet 705, the first device 210 may indicate the FLOW field of the third response message 706 as ACK. Furthermore, because the FLOW field of the received second response message 704 indicates ACK and the first device 210 normally receives the data packet 705, the first device 210 may take all of them into account and may transmit the third response message 706, the ARQN field of which is set to ACK. The third device 230 may ignore the FLOW field of the third response message 706 so as to not process the FLOW field of the third response message 706.

In operation 613, the second device 220 may monitor the first communication link 201 to receive the third response message 706 transmitted to the third device 230 over the first communication link 201 by the first device 210. According an embodiment, the second device 220 may identify that the FLOW field included in the third response message 706 indicates ACK to determine that the first device 210 has normally received the data packet.

According to certain embodiments disclosed in the disclosure, because the first device 210 is able to identify reception information of the second device 220 and because the second device 220 is able to identify reception information of the first device 210, both the first device 210 and the second device 220 may notify the third device 230 of information that the data packet is successfully received fast and efficiently. Furthermore, the third device 230 may reduce the number of times for data retransmission, which may reduce power consumption, and may prevent resources from being wasted.

According to an embodiment, when the first device 210 and/or the second device 220 does not receive the data packet 701 or retransmission thereof, retransmission of the data packet 701 of the third device 230 and transmission of the response message of the first device 210 or the second device 220 may be repeated. Furthermore, the first device 210 and the second device 220 may alternately perform transmission of the response message. According to an embodiment, to prevent retransmission of the data packet 701 of the third device 230 and transmission of the response message of the first device 210 or the second device 220 from being infinitely repeated, the number of retransmissions or the retransmission time period of the third device 230 may be set to be limited.

Hereinafter, operations of a plurality of devices according to an embodiment will be described with reference to FIGS. 2 and 8. The description of the same configuration, operation, and effect as the embodiment described above will be omitted.

Figure 8:
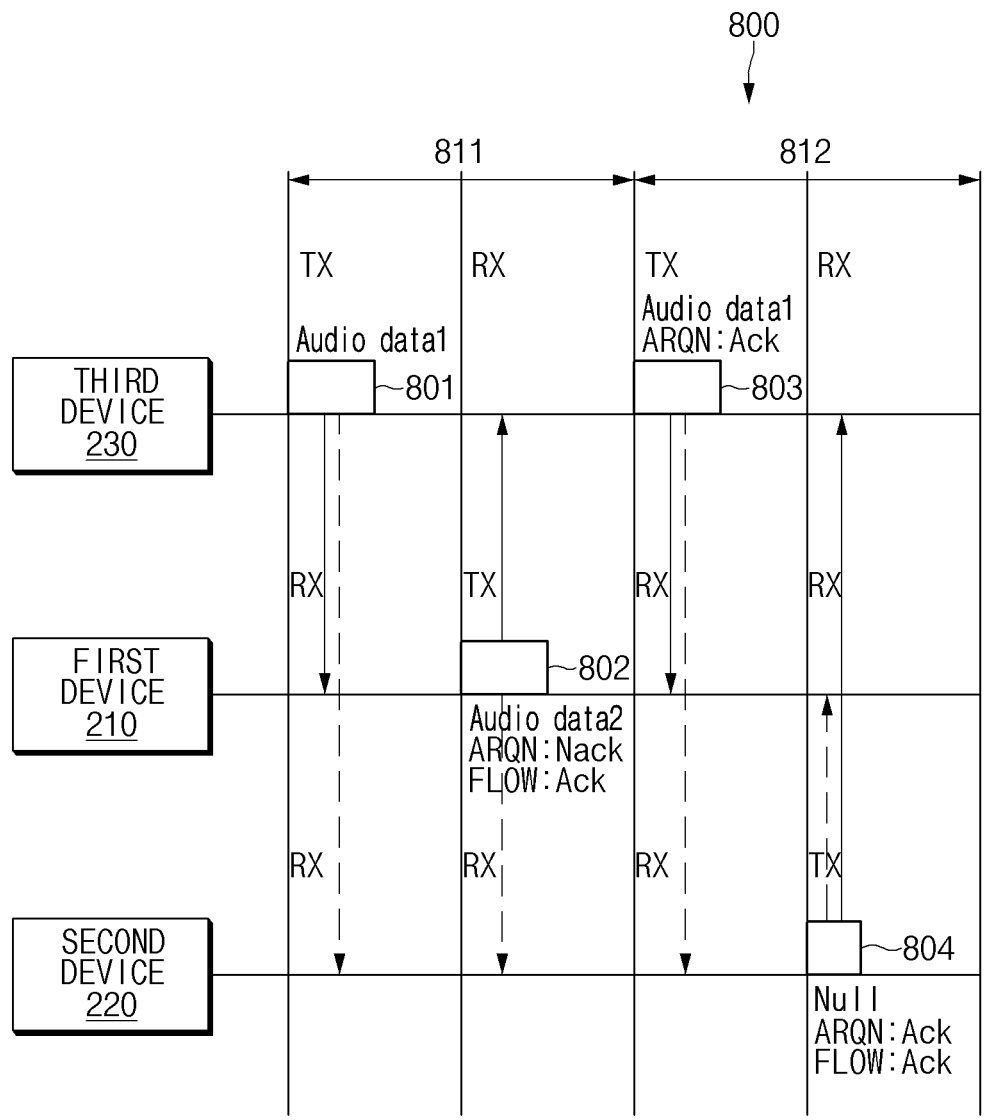
FIG. 8 is a drawing illustrating an operation of transmitting response messages of a plurality of devices in a Bluetooth network environment according to an embodiment.

FIG. 8 is a drawing 800 illustrating an operation of transmitting response messages of a plurality of devices in a Bluetooth network environment according to an embodiment.

The order of the plurality of operations shown in FIG. 8 is not limiting, and for example the order of the communication link establishment operation and the data transmission operation may be changed.

Referring to FIGS. 2 and 8, the third device 230 may transmit first audio data 801 during a reserved time slot 811 over the first communication link 201.

The first device 210 and the second device 220 monitoring the first communication link 201 may receive the first audio data 801.

In response to receiving the first audio data 801, the first device 210 may transmit a first response message 802 to the third device 230 over the first communication link 201 in a slot subsequent to a slot in which the first audio data 801 is received in the reserved time slot 811.

According an embodiment, upon receiving the first response message 802, the third device 230 may identify NACK information of an ARQN field 504 of the first response message 802 to determine that the first audio data 801 is not normally transmitted to the first device 210 and/or the second device 220. The third device 230 may retransmit the same audio data 803 depending on determining that the first audio data 801 is not normally transmitted to the first device 210 and/or the second device 220. The third device 230 may retransmit the same audio data 803 during a time slot (retransmission window) allowed for retransmission.

Because the first device 210 does not know whether the second device 220 has normally received the first audio data 801, irrespective of whether the first device 210 has normally received the first audio data 801, the first device 210 may set the ARQN field (e.g., ARQN field 504 of FIG. 5) of the first response message 802 to indicate NACK and may transmit the first response message 802. Furthermore, because the first device 210 successfully receives the first audio data 801, it may set the FLOW field (e.g., FLOW field 503 of FIG. 5) of the first response message 802 to indicate ACK and may transmit the first response message 802.

According to an embodiment, the first device 210 may include second audio data in the first response message 802. According to an embodiment, the first device 210 may include an audio input interface. The second audio data may be input to the first device 210 through the audio input interface. According to an embodiment, the second audio data may be included in the payload (e.g., PAYLOAD 508 of FIG. 5) of the first response message 802.

Monitoring the first communication link 201, the second device 220 may receive the first response message 802 to obtain the first audio data.

According an embodiment, upon successfully receiving the first response message 802, the third device 230 may transmit a second response message 803 over the first communication link 201 in response to the first response message 802. According to an embodiment, when normally receiving the first response message 802, the third device 230 may include and transmit ACK information in the ARQN field of the second response message 803.

According an embodiment, the third device 230 may identify the NACK information of the ARQN field of the first response message 802 to determine that the first audio data 801 is not normally transmitted to the first device 210 and/or the second device 220 and may include the same first audio data in the second response message 803 and transmit the second response message 803. According to an embodiment, the first audio data may be included in the payload of the second response message 803. The second response message 803 may be a retransmission message of the first audio data.

The first device 210 and the second device 220 monitoring the first communication link 201 may receive the second response message 803.

Upon receiving the second response message 803, the second device 220 may transmit a third response message 804 in response to the second response message 803. According to an embodiment, because of the successful reception of the first audio data 801 or 803, the second device 220 may indicate the FLOW field of the third response message 804 as ACK. Furthermore, according to an embodiment, because the FLOW field of the received first response message 802 indicates ACK and the second device 220 has normally received the first audio data 801 or 803, the second device 220 may take both successful transmissions into account and may indicate the ARQN field of the third response message 804 as ACK and transmit the third response message 804. According an embodiment, the second device 220 may identify that the ARQN field of the received second response message 803 indicates ACK to determine that the third device 230 normally receives the second audio data. Thus, the second device 220 may not include the second audio data in the third response message 804.

According to certain embodiments disclosed in the disclosure, the second device 220 may also obtain the second audio data received through the audio input interface by the first device 210. When the third device 230 does not receive the second audio data (e.g., the ARQN field of the second response message 803 is NACK), the second device 220 may include the second audio data received through the audio input interface in the third response message 804 and transmit the same to the third device 230. Thus, the third device 230 may receive the second audio data in a faster manner without waiting for the transmission from the first device 210.

Hereinafter, operations of a plurality of devices according to an embodiment will be described with reference to FIGS. 2 and 9. The description of the same configuration, operation, and effect as the embodiment described above will be omitted.

Figure 9:
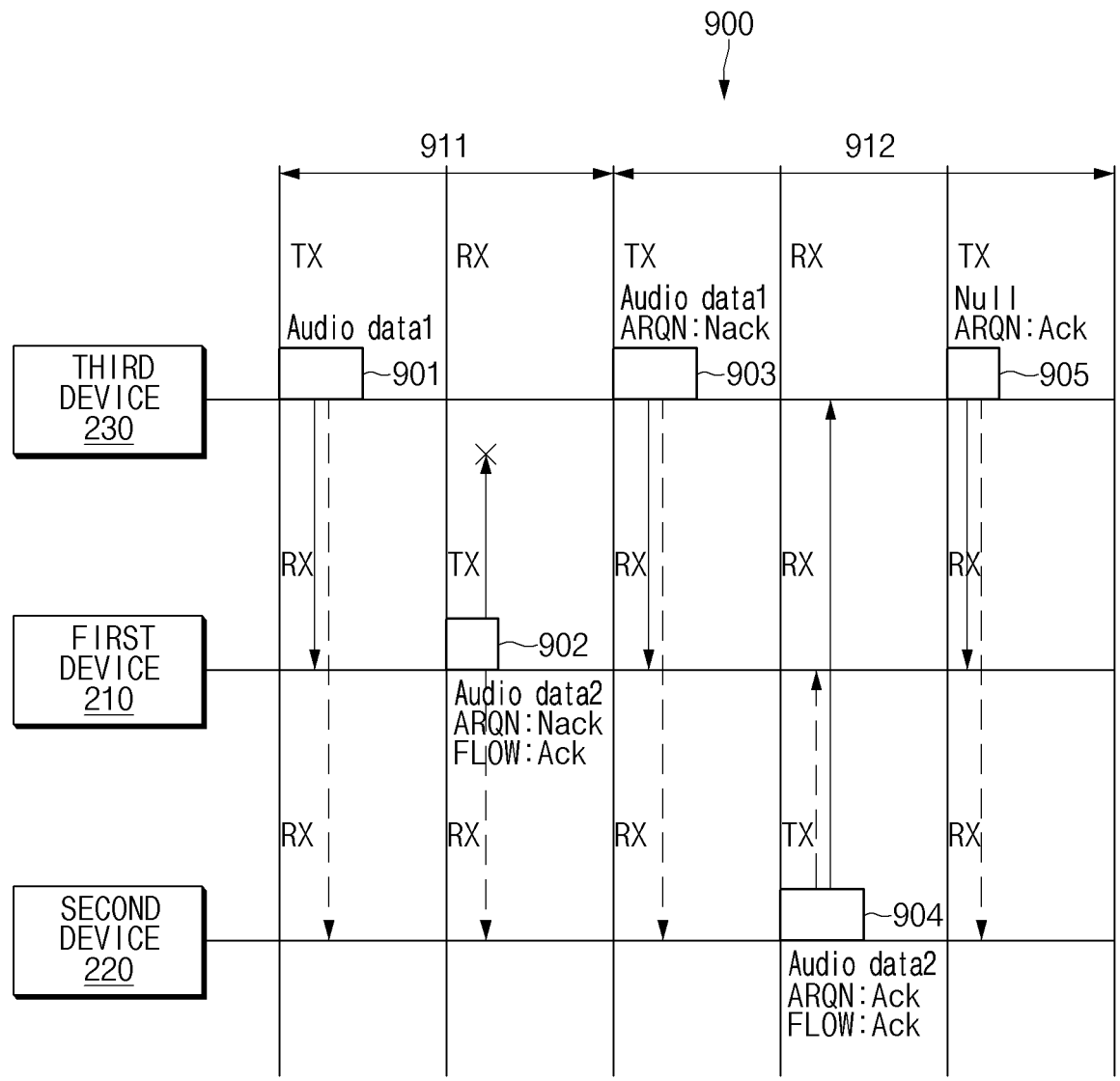
FIG. 9 is a drawing illustrating an operation of transmitting response messages of a plurality of devices in a Bluetooth network environment according to an embodiment.

FIG. 9 is a drawing 900 illustrating an operation of transmitting response messages of a plurality of devices in a Bluetooth network environment according to an embodiment.

The order of the plurality of operations shown in FIG. 9 is not limiting, and for example the order of the communication link establishment operation and the data transmission operation may be changed.

Referring to FIGS. 2 and 9, the third device 230 may transmit first audio data 901 during a reserved time slot 911 over the first communication link 201.

The first device 210 and the second device 220 monitoring the first communication link 201 may receive the first audio data 901.

In response to receiving the first audio data 901, the first device 210 may transmit a first response message 902 to the third device 230 over the first communication link 201 in a slot subsequent to a slot in which the first audio data 901 is received in the reserved time slot 911.

Because the first device 210 does not know whether the second device 220 has normally received the first audio data 901, irrespective of whether the first device 210 has normally received the first audio data 901, the first device 210 may set the ARQN field of the first response message 902 to indicate NACK and may transmit the first response message 902 during a time slot (retransmission window) allowed for retransmission. Furthermore, because of successfully receiving the first audio data 901, the first device 210 may set the FLOW field of the first response message 902 to indicate ACK and may transmit the first response message 902.

According to an embodiment, the first device 210 may include second audio data in the first response message 902. According to an embodiment, the first device 210 may include an audio input interface. The second audio data may be input to the first device 210 through the audio input interface. According to an embodiment, the second audio data may be included in the payload of the first response message 902.

Monitoring the first communication link 201, the second device 220 may receive the first response message 902 to obtain the first audio data 901.

According an embodiment, the third device 230 may fail to receive the first response message 902 due to some error in the communication environment. The third device 230 may transmit a second response message 903 over the first communication link 201 as a response to the first response message 902. According to an embodiment, when not receiving the first response message 902, the third device 230 may include and transmit NACK information in the ARQN field of the second response message 903.

Furthermore, according an embodiment, the third device 230 may identify NACK information of the ARQN field of the first response message 902 and may include and transmit the same first audio data in the second response message 903. The second response message 903 may be a retransmission message of the first audio data.

The first device 210 and the second device 220 monitoring the first communication link 201 may receive the second response message 903.

Upon receiving the second response message 903, the second device 220 may transmit a third response message 904 in response to the second response message. According to an embodiment, because of normally receiving the first audio data 901 or 903, the second device 220 may indicate the FLOW field of the third response message 904 as ACK. Furthermore, according to an embodiment, because the FLOW field of the received first response message 902 indicates ACK and the second device 220 normally receives the first audio data 901 or 903, the second device 220 may take both successful transmissions into account and may indicate the ARQN field of the third response message 904 as ACK and transmit the third response message 904. According an embodiment, the second device 220 may identify that the ARQN field of the received second response message 903 indicates NACK to determine that the third device 230 does not normally receive the second audio data. Thus, the second device 220 may include the second audio data in the third response message 904 to transmit the third response message 904.

According to an embodiment, when normally receiving the third response message 904, the third device 230 may transmit a fourth response message 905 in response to the third response message 904. According to an embodiment, the third device 230 may include ACK information indicative of successful reception of the third response message 904 in the ARQN field of the fourth response message 905. Identifying the ACK information of the ARQN field of the third response message 904, the third device 230 may not include the first audio data in the fourth response message 905.

According to certain embodiments disclosed in the disclosure, because the second device 220 is able to also obtain the second audio data received through the audio input interface by the first device 210, when the third device 230 does not receive the second audio data from the first device 210, the second device 220 may transmit the second audio data to the third device 230.

Hereinafter, description will be given of an operation of the first device according to an embodiment with reference to FIG. 10.

Figure 10:
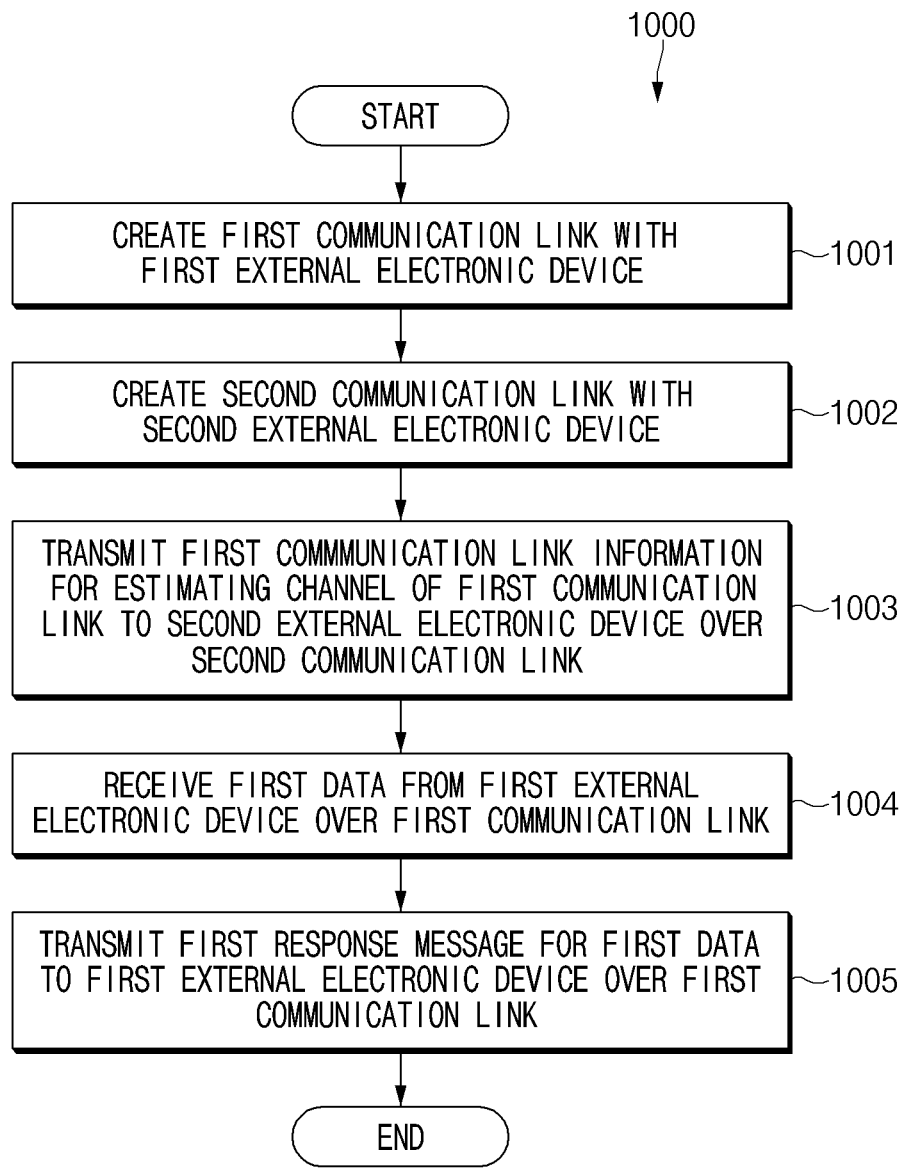
FIG. 10 is a flowchart illustrating an operation of a first device (e.g., a first device of FIG. 2) according to an embodiment.

FIG. 10 is a flowchart 1000 illustrating an operation of a first device (e.g., first device 210 of FIG. 2) according to an embodiment. The description of the same configuration, operation, and effect as the embodiment described above will be omitted.

In operation 1001, the first device (e.g., the first device 210 of FIG. 2) may create a first communication link (e.g., first communication link 201 of FIG. 2) with a first external electronic device (e.g., third device 230 of FIG. 2).

In operation 1002, the first device may create a second communication link (e.g., second communication link 202 of FIG. 2) with a second external electronic device (e.g., second device 220 of FIG. 2).

In operation 1003, the first device may transmit information associated with the first communication link for estimating a channel of the first communication link to the second external electronic device over the second communication link. For example, the information associated with the first communication link may include address information (e.g., Bluetooth address of a master device of the first communication link, Bluetooth address of the first external electronic device, and/or a Bluetooth address of the first device), piconet clock information (e.g., clock native (CLKN) of the master device of the first communication link), logical transport (LT) address information (e.g., information assigned by the master device of the first communication link), used channel map information, link key information, service discovery protocol (SDP) information (e.g., service and/or profile information associated with the first communication link), and/or supported feature information. The information associated with the first communication link may further include, for example, an extended inquiry response (EIR) packet. The EIR packet may include resource control information of the first communication link and/or information about the manufacturer of one or more of the devices involved.

In operation 1004, the first device may receive first data from the first external electronic device over the first communication link. In one embodiment, the first data may be an audio packet.

In operation 1005, the first device may transmit a first response message for the first data to the first external electronic device over the first communication link. In one embodiment, the first response message may include a bitfield configured not to be processed by the first external electronic device, and the bitfield may include reception information about the first data of the first device.

Hereinafter, description will be given of an operation of the second device according to an embodiment with reference to FIG. 11.

Figure 11:
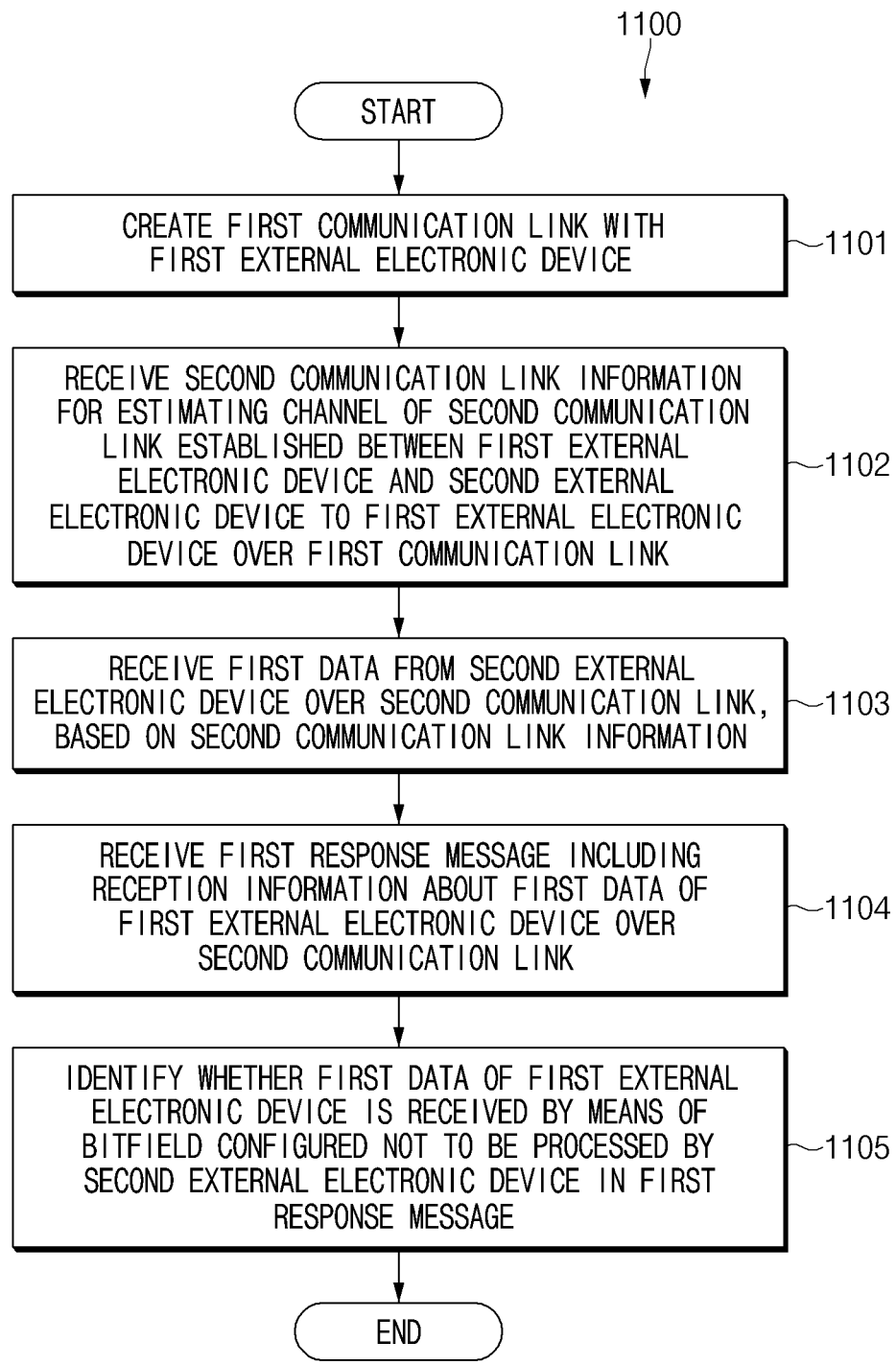
FIG. 11 is a flowchart illustrating an operation of a second device (e.g., a second device of FIG. 2) according to an embodiment.

FIG. 11 is a flowchart 1100 illustrating an operation of a second device (e.g., second device 220 of FIG. 2) according to an embodiment. The description of the same configuration, operation, and effect as the embodiment described above will be omitted.

In operation 1101, the second device (e.g., the second device 220 of FIG. 2) may create a first communication link (e.g., second communication link 202 of FIG. 2) with a first external electronic device (e.g., first device 210 of FIG. 2).

In operation 1102, the second device may receive second communication link information for estimating a channel of a second communication link (e.g., first communication link 201 of FIG. 2) established between the first external electronic device and a second external electronic device (e.g., third device 230 of FIG. 2) from the first external electronic device over the first communication link. For example, the information associated with the second communication link may include address information (e.g., Bluetooth address of a master device of the second communication link, Bluetooth address of the first external electronic device, and/or Bluetooth address of the second external electronic device), piconet clock information (e.g., clock native (CLKN) of the master device of the second communication link), logical transport (LT) address information (e.g., information assigned by the master device of the second communication link), used channel map information, link key information, service discovery protocol (SDP) information (e.g., service and/or profile information associated with the second communication link), and/or supported feature information. The information associated with the second communication link may further include, for example, an extended inquiry response (EIR) packet. The EIR packet may include resource control information of the second communication link and/or information about the manufacturer of one or more of the devices involved.

In operation 1103, the second device may receive first data from the second external electronic device over the second communication link, based on second communication link information. In one embodiment, the first data may be audio data.

In operation 1104, the second device may receive a first response message including reception information about the first data of the first external electronic device over the second communication link.

In operation 1105, the second device may identify whether the first data of the first external electronic device is received by using a bitfield configured not to be processed by the second external electronic device in the first response message.

An electronic device 210 according to an embodiment disclosed in the disclosure may include wireless communication circuitry, a processor operatively connected with the wireless communication circuitry, and a memory operatively connected with the processor. The memory may store one or more instructions that, when executed, cause the processor to create a first communication link 201 with a first external electronic device 230 through the wireless communication circuitry, create a second communication link 202 with a second external electronic device 220 through the wireless communication circuitry, transmit first communication link information for estimating a channel of the first communication link 201 to the second external electronic device 220 over the second communication link 202, receive first data from the first external electronic device 230 over the first communication link 201, and transmit a first response message for the first data to the first external electronic device 230 over the first communication link 201. The first response message may include a bit configured not to be processed by the first external electronic device 220, and the bit may include reception information about the first data by the electronic device 210. The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The bit may be a bit of a FLOW field. When the electronic device 210 receives the first data, the bit of the FLOW field of the first response message may indicate positive acknowledgement (ACK) information. When the electronic device 210 does not receive the first data, the bit of the FLOW field of the first response message may indicate negative acknowledgement (NACK) information.

The first response message may further include an ARQN field. Regardless of whether the electronic device 210 receives the first data, a bit of the ARQN field of the first response message may indicate NACK information.

The bit may be included in a data payload of the first response message. When the electronic device 210 receives the first data, the bit in the data payload of the first response message may indicate ACK information. When the electronic device 210 does not receive the first data, the bit in the data payload of the first response message may indicate NACK information.

The electronic device 210 may further include an audio input interface operatively connected with the processor.

The instructions may cause the processor to include second data input through the audio input interface in the first response message.

The instructions may cause the processor to receive a second response message transmitted over the first communication link 201 by the second external electronic device 220 and identify whether the first data is received by the second external electronic device 220 by using a FLOW field of the second response message.

The second response message may further include an ARQN field. The instructions may cause the processor to form a third response message based on the FLOW field of the second response message and whether the electronic device 210 receives the first data and transmit the third response message over the first communication link 201, when a bit of the ARQN field of the second response message indicates NACK information.

The third response message may include an ARQN field. When a bit of the FLOW field of the second response message indicates NACK information, a bit of the ARQN field of the third response message may indicate NACK information.

The third response message may include an ARQN field. When a bit of the FLOW field of the second response message indicates ACK information and when the electronic device 210 receives the first data, a bit of the ARQN field of the third response message may indicate ACK information.

The third response message may include an ARQN field. When a bit of the FLOW field of the second response message indicates ACK information and when the electronic device 210 does not receive the first data, a bit of the ARQN field of the third response message may indicate NACK information.

An electronic device 210 according to an embodiment disclosed in the disclosure may include wireless communication circuitry, a processor operatively connected with the wireless communication circuitry, and a memory operatively connected with the processor. The memory may store one or more instructions that, when executed, cause the processor to create a first communication link 202 with a first external electronic device 210 through the wireless communication circuitry, receive second communication link information for estimating a channel of a second communication link 201 established between the first external electronic device 210 and a second external electronic device 230 from the first external electronic device 210 over the first communication link 202, receive first data from the second external electronic device 230 over the second communication link 201, based on the second communication link information, receive a first response message including reception information about the first data by the first external electronic device 210 over the second communication link 201, and identify whether the first data is received by the first external electronic device 210 by using a bit configured not to be processed by the second external electronic device 230 in the first response message.

The bit may be a bit of a FLOW field. The instructions may cause the processor to identify that the first external electronic device 210 receives the first data, when the bit of the FLOW field of the first response message indicates ACK information, and identify that the first external electronic device 210 does not receive the first data, when the bit of the FLOW field of the first response message indicates NACK information.

The first response message may further include an ARQN field. A bit of the ARQN field of the first response message may indicate NACK information.

The instructions may cause the processor to receive the first data again from the second external electronic device 230 over the second communication link 201, based on the second communication link information, and form a second response message based on the bit of the FLOW field of the first response message and whether the electronic device 220 has received the first data to transmit the second response message over the second communication link 201.

The second response message may include an ARQN field. When the bit of the FLOW field of the first response message indicates NACK information, a bit of the ARQN field of the second response message may indicate NACK information.

The second response message may include an ARQN field. When the bit of the FLOW field of the first response message indicates ACK information and when the electronic device 220 receives the first data, a bit of the ARQN field of the second response message may indicate ACK information.

The second response message may include an ARQN field. When the bit of the FLOW field of the first response message indicates ACK information and when the electronic device 220 does not receive the first data, a bit of the ARQN field of the second response message may indicate NACK information.

The second response message may include a FLOW field. When the electronic device 210 receives the first data, a bit of the FLOW field of the second response message may indicate ACK information. When the electronic device 210 does not receive the first data, the bit of the FLOW field of the second response message may indicate NACK information.

The first response message may further include second data input through an audio input interface of the first external electronic device 210.

The electronic device 220 may further include an audio input interface operatively connected with the processor. The instructions may cause the processor to include second data input through the audio input interface in the second response message.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device, comprising:
   wireless communication circuitry;
   a processor operatively connected with the wireless communication circuitry; and
   a memory operatively connected with the processor,
   wherein the memory stores one or more instructions that, when executed, cause the processor to:
   establish a first communication link with a first external electronic device through the wireless communication circuitry;
   establish a second communication link with a second external electronic device through the wireless communication circuitry;
   transmit, over the second communication link, first communication link information associated with the first communication link to the second external electronic device, wherein the first communication link information is used by the second external electronic device to monitor the first communication link;
   receive first data from the first external electronic device over the first communication link; and
   transmit a first response message for the first data to the first external electronic device over the first communication link,
   wherein the instructions further cause the processor to:
   receive a second response message transmitted over the first communication link by the second external electronic device, wherein the second response message includes a first FLOW (flow control) field and a first ARON (automatic repeat request number) field;
   identify whether the first data is received by the second external electronic device based on the first FLOW field of the second response message:
   form a third response message based on the first FLOW field of the second response message and whether the electronic device receives the first data, based on determining that a first ARON bit in the first ARON field of the second response message indicates negative acknowledgement (NACK); and transmit the third response message over the first communication link to the first external electronic device.

2. The electronic device of claim 1, wherein the first response message includes a specific bit configured not to be processed by the first external electronic device, and
wherein the bit includes information on reception of the first data by the electronic device.

3. The electronic device of claim 2, wherein the specific bit is a FLOW bit in a second FLOW field of the first response message, and
wherein the FLOW bit in the second FLOW field of the first response message indicates positive acknowledgement (ACK), if the electronic device receives the first data, and
wherein the FLOW bit in the second FLOW field of the first response message indicates NACK, if the electronic device does not receive the first data.

4. The electronic device of claim 3, wherein the first response message further includes a second ARON field, and
wherein a second ARON bit in the second ARON field indicates NACK, regardless of whether the electronic device receives the first data.

5. The electronic device of claim 2, wherein the specific bit is included in a data payload of the first response message,
wherein the specific bit in the data payload of the first response message indicates ACK, if the electronic device receives the first data, and
wherein the specific bit in the data payload of the first response message indicates NACK, if the electronic device does not receive the first data.

6. The electronic device of claim 1, further comprising:
an audio input interface operatively connected with the processor,
wherein the instructions further cause the processor to include second data input through the audio input interface in the first response message.

7. The electronic device of claim 1, wherein the third response message includes a second ARQN field, and
wherein a second ARON bit in the second ARQN field of the third response message indicates NACK, if a FLOW bit in the first FLOW field of the second response message indicates NACK.

8. The electronic device of claim 1, wherein the third response message includes a second ARQN field, and
wherein a second ARON bit in the second ARQN field of the third response message indicates ACK, if a FLOW bit in the first FLOW field of the second response message indicates ACK and the electronic device receives the first data.

9. The electronic device of claim 1, wherein the third response message includes an second ARQN field, and wherein a second ARON bit of the second ARQN field of the third response message indicates NACK, if a FLOW bit in the first FLOW field of the second response message indicates ACK and when the electronic device does not receive the first data.

* * * * *